Inventors
R. A. Cail
E. M. Payne

R. A. CAIL ET AL 2,944,737

IMPROVEMENTS RELATING TO CONTROL SYSTEMS FOR
AUTOMATIC MACHINE TOOLS

Filed June 29, 1955

Inventors
R. A. Cail
E. M. Payne
By Gleserk Dowring Seibold
Attys

July 12, 1960

R. A. CAIL ET AL 2,944,737

IMPROVEMENTS RELATING TO CONTROL SYSTEMS FOR
AUTOMATIC MACHINE TOOLS

Filed June 29, 1955

Inventors
R.A.Cail
E.M.Payne
By Hancock Downing
Attys.

United States Patent Office 2,944,737
Patented July 12, 1960

2,944,737

IMPROVEMENTS RELATING TO CONTROL SYSTEMS FOR AUTOMATIC MACHINE TOOLS

Roland Allan Cail, Slough, and Edwin Malcolm Payne, Chorley Wood, England, assignors to Electric & Musical Industries Limited, Hayes, England, a company of Great Britain Filed June 29, 1955, Ser. No. 518,914

Claims priority, application Great Britain July 3, 1954

7 Claims. (Cl. 235—151)

This invention relates to control systems for automatic machine tools and relates especially though not exclusively for automatic electronically controlled milling machines.

In co-pending U.S. patent application No. 518,912, now Patent No. 2,887,638, there is described an automatic electronically controlled milling machine in which a workpiece can be milled to a predetermined profile under control of dimensional instructions relating only to discrete ordinates on the workpiece. The dimensional instructions represent radii and the ordinates represent angles and the radii are derived, for example, from a perforated record and to provide for a smooth transition from ordinate to ordinate, provision is made in the machine for interpolating between the discrete radii. In the example described in the co-pending application, provision is made for quadratic interpolation, and to achieve this it is necessary that three radii be used simultaneously in the interpolation process. The radii are read in succession from the record and data stores are provided which set up alternating voltages having amplitudes which are analogous to the radii derived from the record. These stores retain the radii over the period for which they are required for the interpolation process and a selector is provided which selects radii from the stores in a predetermined cyclic sequence and feeds them to the interpolating means. For example, during one period the ordinate selector may apply the first, second and third of a group of radii to one quadratic interpolator which during this period interpolates radii over the angular range from midway between the first and second radii to midway between the second and third radii. Moreover, during this period, the next radii is read from the record and set up in a further store and the ordinate selector applies the second, third and fourth radii to a second interpolator which is conditioned to take over from the first interpolator at the end of the period in question. When the change over occurs the second interpolator then interpolates radii over the angular range from midway between the second and third radii to midway between the third and fourth radii, during the succeeding period. A similar sequence of operations is repeated cyclically. It will be appreciated that in this apparatus at least four stores are required, the stores being cleared, and filled by successive radii in cyclic order.

Such a mode of operation can however only cause the machine to follow a continuous profile and in some cases it may be desired to shape, say, a cam to a discontinuous profile and one object of the present invention is to provide an improved automatic machine tool control system by means of which discontinuous operation can be achieved without manual intervention.

Another problem is encountered in automatic machines such as indicated when a profile has been followed in which a relatively large change in the profile occurs in a small region, whereas the profile is fairly uniform over a large region. If the ordinate spacing (that is, the angular spacing between the discrete radii recorded as instructions on the record in the case described above) is chosen sufficiently small to enable the shaping to be performed accurately where the profile changes rapidly there are an unnecessarily large number of dimensions covering the region in which the profile is relatively uniform.

Another object of the present invention is to reduce the difficulty indicated in the preceding paragraph.

According to one aspect of the present invention there is provided a control system for automatic machine tools comprising means for reading from a record to derive discrete instruction signals corresponding to relatively widely spaced ordinates of a desired locus, an interpolator of higher than linear order, selector means for applying said discrete signals in groups of at least three to said interpolator successive groups of instructions normally having at least two common instructions, said interpolator being responsive to applied signals to derive an instruction signal which varies to represent more closely spaced ordinates of said locus, means for effecting relative displacement between two components of a machine tool in response to the instruction signal output of said interpolator, and means for modifying the operation of said selector means to cause successive groups of instructions to have only one common instruction so that discontinuous operation can be achieved.

According to another aspect of the present invention there is provided a control system for automatic machine tools comprising means for deriving from a record to derive discrete instruction signals corresponding to relatively widely spaced ordinates of a desired locus, an interpolator, selector means for applying said discrete signals in groups of at least two to said interpolator, said interpolator being responsive to applied signals to derive an instruction signal which varies to represent more closely spaced ordinates of said locus, means for effecting relative displacement between two components of a machine tool in response to the instruction signal output of said interpolator, and means responsive to a predetermined instruction derived from said record for modifying the operation of said interpolator to correspond to a change of ordinate spacing.

In order that the invention may be clearly understood and readily carried into effect, the invention will be described with reference to the accompanying drawings, in which.

Figure 1:
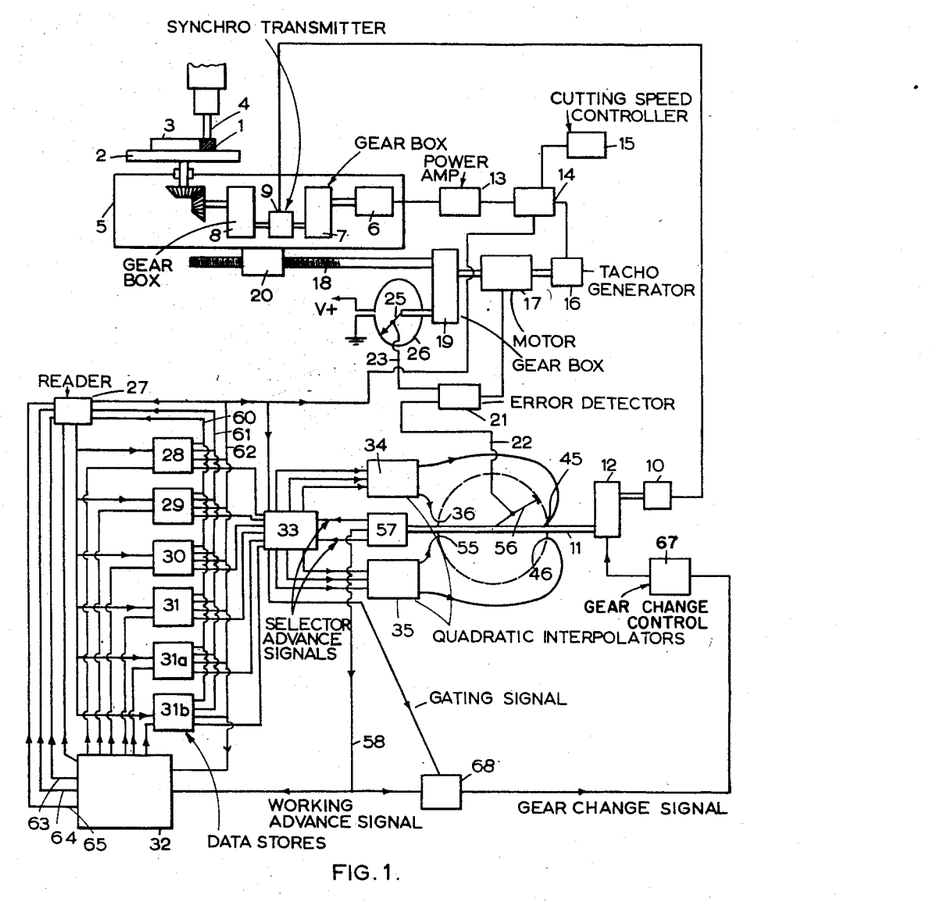
Figure 1 illustrates diagrammatically and mainly in block form one example of an automatic machine tool control system according to the present invention.

Referring to the drawing, the machine tool shown in Figure 1 is generally of the same construction as described and illustrated in co-pending U.S patent application No. 518,912, and corresponding parts in this and the co-pending application are denoted by the same reference numerals. The control system shown in Figure 1 of the accompanying drawings in response to instructions derived from a perforated film record. The instructions are coded in a twenty four bit binary digital code, each instruction occupying one row of record so that a row on the record may have up to twenty-four holes. Apart from functional instructions, which will be referred to subsequently, each instruction relates to the radius to which a work piece has to be cut, at a given angular displacement of the workpiece from a predetermined datum. In preparing the instructions the radius of the milling cutter may have to be taken into consideration, or the machine may be provided with means for automatically compensating for the radius of the cutter as described U.S. application Serial No. 524,720 filed July 27, 1955 R. A. Cail, now Patent No. 2,917,693. For simplicity in the present application it will be assumed that the diameter of the cutter is automatically allowed for so that each dimensional instructions denotes the actual radius to which the workpiece has to be cut.

Of the twenty-four bits of the code used for each numerical instruction, five groups of four bits, in all bits five to twenty four are used to represent five decimal digits, so that the instructions are recorded in the so-called binary decimal code. The code bits five to nine represent the highest order decimal digit, the bits ten to fourteen the next highest order decimal digit and so on. The binary decimal code is redundant to the extent that each four bits may represent more than ten numbers, and some of the redundant code combinations are used to represent functional instructions. For example four "ones" (represented by holes in the tape) in positions five to nine denotes "stop" which as will appear overrides all other instructions. Four "ones" in positions ten to fourteen denotes "error" and causes the proceeding instructions to be replaced by the next following instruction. "Zero" (represented by no hole on tape) in all the positions five to twenty four causes the record to advance, and a hole in all positions gives rise to a clearance of all data stores.

In the diagram of the machine shown in Figure 1 the cutter is represented by the reference 1 and the worktable by the reference 2. A workpiece 3 is shown on the table and it will be assumed that the workpiece has to be milled to form a cam of predetermined profile. The cutter shaft 4 has a fixed axis and the cutter is driven by any suitable means, not shown. The worktable is rotatably mounted on a platform represented by the outline 5 and it can be driven by an electric motor 6 through the intermediary of two gear boxes 7 and 8. A synchro-transmitter or magslip transmitter 9 is disposed as shown between the two gear boxes 7 and 8 so as to be driven by the motor 6, the output of the transmitter 9 being applied to a synchro-receiver 10 so as to maintain a shaft 11 driven by the receiver 10 through the intermediary of a gear box 12 in synchronism with the table rotation.

The electric motor 6 for producing the table rotation is a variable speed D.C. motor and it is energised by the output of a power amplifier 13 which may be of the Ward-Leonard type. The input signal for this power amplifier is in turn derived from another amplifier 14 which is referred to as a servo amplifier and may be a thermionic valve amplifier. The input signals to this amplifier is received from a cutting speed controller 15 and assuming that the gain of the amplifier 14 is fixed, the speed of rotation of the motor 6 and therefore of the table 2 is determined by a potential applied to the amplifier 14 from the cutting speed controller 15. The controller 15 may for example consist simply of a potentiometer energised from a source of reference voltage. The gain of the servo amplifier 14 is however adjustable in response to an input potential derived from a tacho generator 16 mounted on the shaft of a servo motor 17 which drives a leadscrew 18 through the intermediary of a gear box 19. The lead screw 18 engages a nut 20 attached to the platform 5 and it will therefore be appreciated that the rotation of the lead-screw 18 effects relative displacement between the axes of the table 2 and of the cutter 1. Therefore it determines the radius to which the workpiece is cut at any particular angular position. The servo motor 17 is energised by the output of an error detector 21 which receives one alternating current input via a lead 22 representing the radius to which the workpiece 3 should be cut at the instantaneous working point of the cutter 1. The error detector 21 receives from a lead 23 a second input signal which is an analogue of the table displacement. For simplicity the analogue is shown as being derived from a tap 25 of a simple potentiometer 26, the tap 25 being carried on a rotatable arm driven from the shaft of the motor 17 through gearing in the gear box 19. In practice a more accurate device for deriving the analogue of the table displacement will generally be required and this device may comprise a linear interpolator of the construction described in co-pending U.S. patent application Serial No. 484,202. The error detector 21 may consist of high gain negative feedback amplifier and a rectifier to which signals on the lead 22 and 23 are applied in polarity opposition.

The signal representing the desired radius of the workpiece of the instantaneous working point of the cutter 1 is a continuously variable signal derived by a process of interpolation from the dimensional instructions recorded on the record described above. The dimensional instructions refer of course to discrete points on the workpiece. In normal operation of the machines the dimensional instructions are read from the tape in succession by a tape reader 27 and each instruction is applied in parallel to data stores 28 to 31, 31a and 31b. In this respect the apparatus shown differs from that described in the specification of co-pending U.S. patent application Serial No. 518,912, now Patent No. 2,887,638, in which only four stores are required. The stores are however only conditioned for acceptance of a dimensional instruction when they simultaneously receive a sensitising pulse from a programme unit 32, and the programme unit is so constructed that it feeds sensitising pulses in cyclic order to the data stores so that the successive dimensional instructions are accepted in this order by the respective stores. Only a single connection is shown between the reader 27 and the stores 28 to 31 for feeding instructions thereto, but as will appear subsequently this connection comprises 20 conductors, one corresponding to each bit of the code used to represent a dimension. When any one of the data stores receives a dimensional instruction, it converts the instruction from the binary decimal code formed into a voltage analogue. During the normal operation of the machine it is necessary that at least three successive stores deliver voltage analogues simultaneously and the outputs of the stores are fed selectively by a selector 33 to two quadratic interpolators 34 and 35. Thus, assuming that during one period the analogues set up by the stores 28, 29 and 30 are applied by the selector 33 to the interpolator 34, the next instruction is set up as an analogue in the store 31 and the selector 33, without disturbing the interpolator 34 applies the analogues from the stores 29, 30 and 31 to the interpolator 35. During the period in question the interpolator 34 effects interpolation among the analogues from the stores 28, 29 and 30, but the period ends when the interpolation has proceeded to the points mid-way between the instructions in the stores 29 and 30, when the interpolator 35 takes over. While the interpolator 35 is operative, the next instruction is set up as an analogue in the store 31a, and when the interpolator 35 reaches the end of interpolation range, the interpolation is taken over again by the interpolator 34, which interpolates among the instructions in the stores 30, 31, and 31a. This process continues indefinitely, the stores being used in groups of three, and in cyclic order, with two stores common to each group, so long as no signal is derived from the tape denoting that discontinuous operation is required.

The interpolators are shown merely in block form since their constructions form no part of the present invention. They are preferably of the construction described in co-pending U.S. patent application Serial No. 459,814. The interpolator 34 has eleven output studs 36 to 45 whilst the interpolator 35 has eleven output studs 46 to 55 the end two being half studs in each interpolator, and the twenty two studs 36 to 55 are arranged in a circle as shown. When the interpolator 34 is operating the signal applied to the stud 36 represents the required radius of the workpiece at a point midway between the ordinates of the first two instructions applied to the interpolator. Similarly the signal applied to the stud 45 represents the required radius of the workpiece at a point midway between the ordinates of the second two instructions applied to the interpolator 34. The signals applied to the other studs between 36 and 45 correspond to interpolated radii between these two mid-ordinates. For simplicity, no connections are shown in the drawing to the studs between 36 and 45. The studs 46 to 55 to which output signals are applied by the second interpolator 35 similarly correspond to the radii interpolated between the corresponding mid-ordinates. The circle of studs 36 to 45 is scanned by a brush 56 of the make-before-break type, and consequently the signal derived by the brush 56 and appearing on the lead 22 is a continuously variable signal which represents the required radii of the workpiece 3 at closely spaced points. Assuming that instructions are recorded on the tape for an ordinate spacing of 1 degree, the gearing in the boxes 7 to 12 is arranged so that the brush 56, which is synchronised with the rotation of the table 2, makes one half revolution for each degree of rotation of the table 2. Accordingly, the interpolators 34 and 35 evaluate the radius of the cam at intervals of 1/10 of a degree and the relative displacement between the axis of the table and the cutter are controlled accordingly. Linear sub-interpolation may also be employed to increase the accuracy of the evaluation, as described in co-pending U.S. patent application Serial No. 459,814.

The tacho generator 16 sets up a signal which represents the velocity of the servo-motor 17 and therefore represents the rate of relative displacement between the axes of the cutter 1 and table 2. This in turn is roughly proportional to the load on the cutter and to ensure that the load of the cutter never becomes so great that the accuracy of working is impaired, the voltage derived by tacho generator 16 is applied to the servo-amplifier 14 so as to vary the gain of the latter in such a manner that if the rate of relative displacement between the axis of the table 2 and of the cutter 1 tends to become excessive, the rate of rotation of the table is reduced. By this means the rate of relative displacement between the aforesaid axis can be prevented from becoming excessive. It will thus be appreciated that the motor 17 and the associated mechanism constitutes means for effecting relative displacement between two components, namely the cutter 1 and the table 2 in one co-ordinate direction, in response to instructions derived by the tape reader 27 from the recorder. The motor 6 and associated mechanism constitutes means for effecting relative displacement between the cutter 1 and the table 2 in another co-ordinate direction in dependence on the rate of derivation of an instruction signal to the motor 17 (by virtue of the synchronisation effected by the transmitter 9 and receiver 10). The tacho generator 16 and the amplifier 14 constitute means for adjusting simultaneously the rate of derivation of the instruction signal for the motor 17 and the rate of relative displacement effected by the motor 6, since obviously the rate of derivation of the instruction signal for motor 17 depends on the rate of rotation of the brush 56.

If by the application of the speed control signals to the servo amplifier 14 the rate of rotation of the table 2 is reduced there would be a risk of the reader 27 running ahead of the interpolators 34 and 35, unless precautions be taken to the contrary. These precautions take the form of interlock means between the reader 27, the data stores 28 to 31, the programme unit 32, the selector 33, and the parabolic interpolators. A working control switch 57 is operated by the shaft 11 which carries the brush 56 of the interpolators, and this switch is arranged to apply a selector advance signal to the selector 33 at some time in each half revolution of the brush 56 after a change from one interpolator to the other. The switch 57 also delivers a working advance signal to the programme unit 32 via a connection 58 during each half cycle of the brush 56 so as to control the programme in such a way that the clearance of a data store and the acceptance of a new instruction from the tape reader 27 can only occur when the instruction in the corresponding store is no longer required by the interpolators. The programme unit 32 feeds a reader advancing signal to the reader 27 by way of a connection 59 when there is a store available in receipt of a further signal. Connections 60, 61 and 62 are shown leading from the stores 28 to 31 for the distribution of functional signals from the stores when the stores receive instructions from the reader which does not correspond to a dimension. There are also connections 63, 64 and 65 from the reader 27 to the programme unit 32 for conditioning the latter unit in response to specified conditions in the reader. The functional connections between the units 28 to 33 will be further described with reference to Figures 2 to 5.

In Figures 2 to 5 of the drawings, the following system of references has been adopted to simplify the description and understanding of the drawings. In all but Figure 4, which illustrates one of the data stores, references beginning with the letters RL denote relays and references such as RLA and RLB denote the energising winding of the relays, the figure under such reference letters indicating the number of switches included in the relay and operated by the respective relay winding. Thus relay winding RLA operates two switches and those switches are denoted by the references RLA1 and RLA2. Similarly, relay winding RLB operates two switches RLB1 and RLB2. Each relay switch is shown with two contacts and a switch arm, and the contact which is engaged by the arm in the de-energised state of the corresponding relay is shown in black. References beginning with the letters SW denote switches other than relay switches. The switch 57 also delivers a working advance signal to the programme unit 32 via a connection 58 during each half cycle of the brush 56 so as to control the programme in such a way that the clearance of a data store and the acceptance of a new instruction from the tape reader 27 can only occur when the instruction in the corresponding store is no longer required by the interpolators. The programme unit 32 feeds a reader advancing signal to the reader 27 by way of a connection 59 when there is a store available in receipt of a further signal. Connections 60, 61 and 62 are shown leading from the stores 28 to 31 for the distribution of functional signals from the stores when the stores receive instructions from the reader which does not correspond to a dimension. There are also connections 63, 64 and 65 from the reader 27 to the programme unit 32 for conditioning the latter unit in response to specified conditions in the reader. The functional connections between the units 28 to 33 will be further described with reference to Figures 2 to 5.

Figure 2:
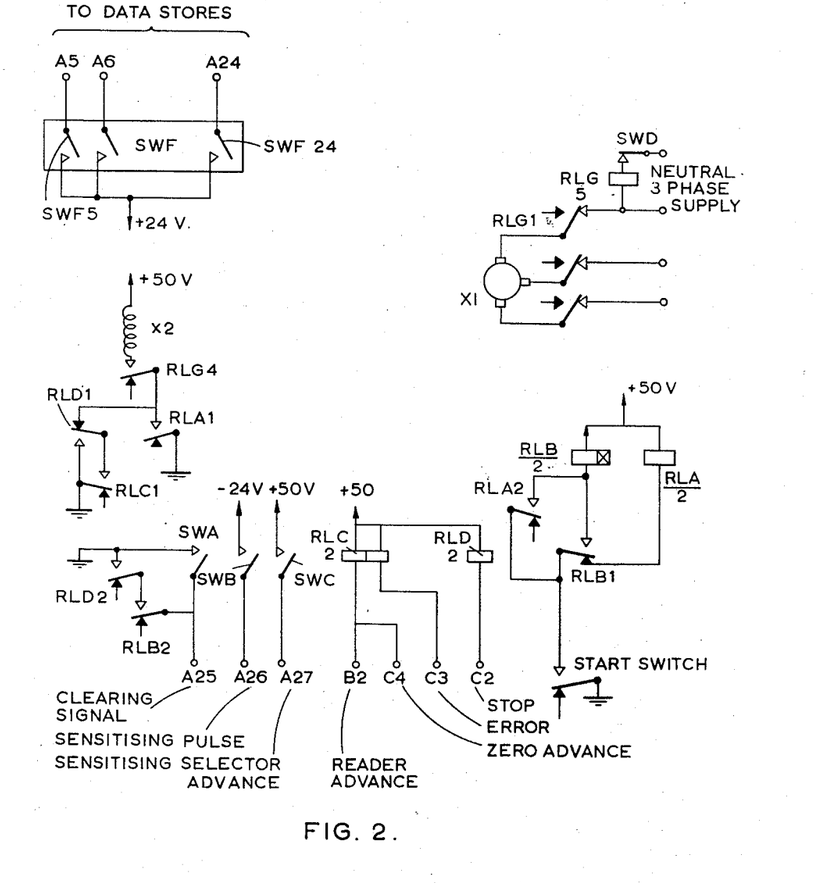
Figure 2 is a circuit diagram of the record reader forming part of Figure 1.
Figure 3:
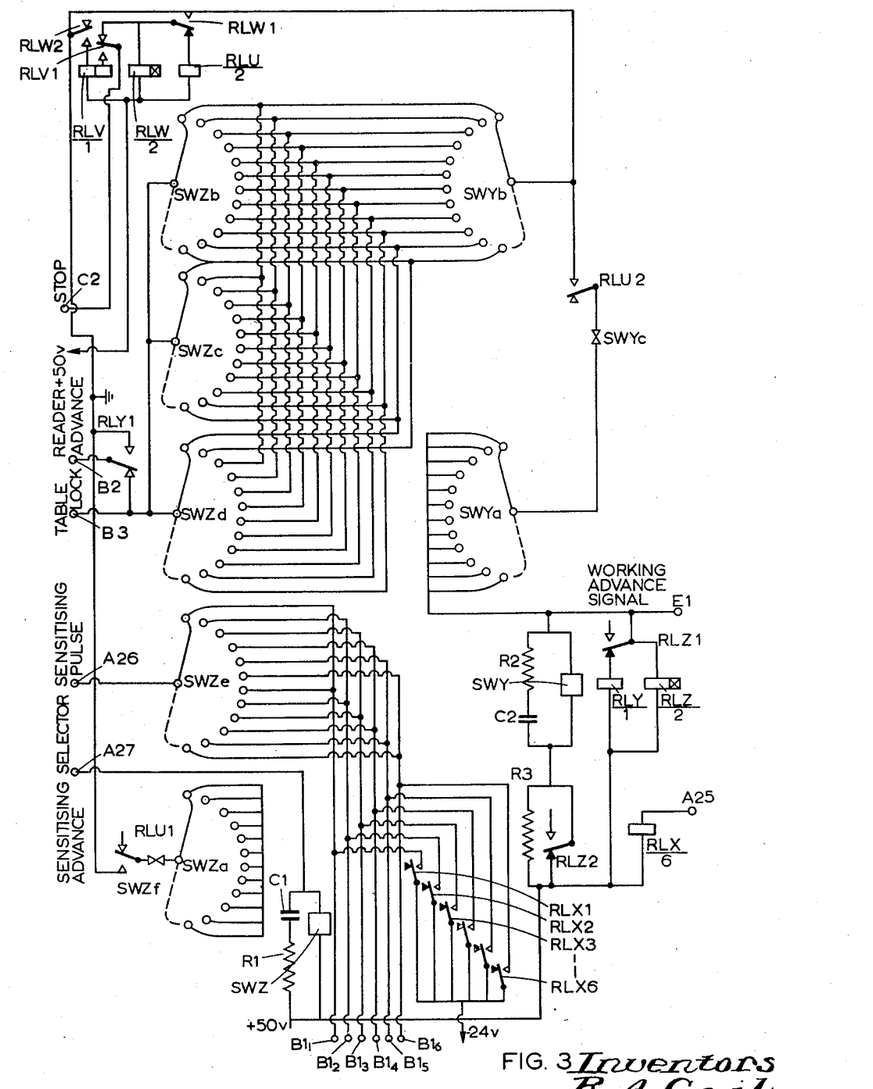
Figure 3 is a circuit diagram of the programme unit employed in Figure 1.
Figure 4:
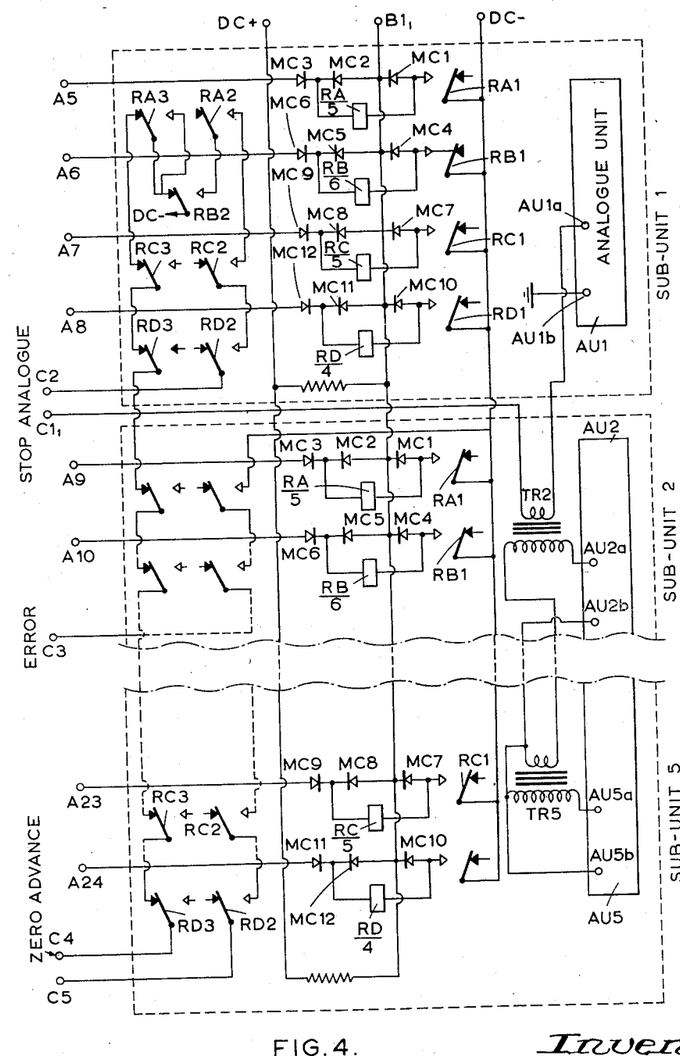
Figure 4 is a circuit diagram of one of the data-stores used in Figure 1.
Figure 5:
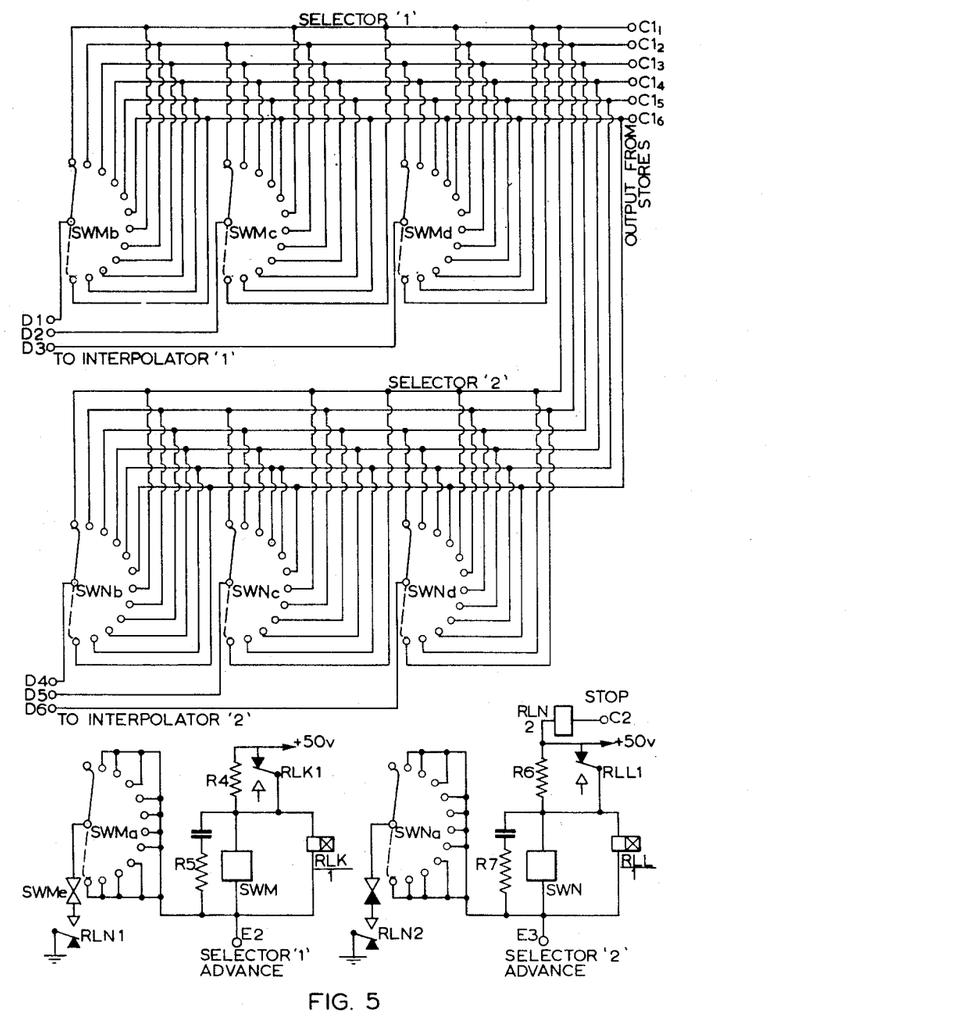
Figure 5 is a circuit diagram of a selector employed in Figure 1.

In Figures 2 to 5 of the drawings, the following system of references has been adopted to simplify the description and understanding of the drawings. In all but Figure 4, which illustrates one of the data stores, reference beginning with the letters RL denote relays and references such as RLA and RLB denote the energising winding of the relays, the figure under such reference letters indicating the number of switches included in the relay and operated by the respective relay winding. Thus relay winding RLA operates two switches and those switches are denoted by the references RLA1 and RLA2. Similarly, relay winding RLB operates two switches RLB1 and RLB2. Each relay switch is shown with two contacts and a switch arm, and the contact which is engaged by the arm in the de-energised state of the corresponding relay is shown in black. References beginning with the letters SW denote switches other than relay switches. The operation of the switches SWA to SWD in Figure 2 will appear from the following description. The switch SWF comprises peckers for sensing the holes in each row of the record. If a hole exists in the tape at the position corresponding to any one of the peckers, a circuit is completed from a 24 v. line through the pecker. Since, in the present description only the code bits five to twenty four are taken into account, only the peckers SWF5 to SWF24 are indicated in Figure 2 and they are connected to terminals A5 to A24 of the reading unit. The switches SWY and SWZ in Figure 3 and SWM and SWN in Figure 5 are so-called uniselectors or digit switches. Each comprises a plurality of banks of studs, each bank having twelve studs, and each bank being scanned by a pair of diametrically opposite contact brushes. The contact brushes of any one uniselector are arranged on a single shaft, and the studs in each corresponding bank are equiangularly disposed about that shaft. For example, in the case of the uniselector switch SWZ, the stud banks and corresponding brushes are denoted by the references SWZa to SWZe, and each stud bank and its corresponding brushes will be referred to hereinafter as a stud switch. Each uniselector has an electro-magnet (denoted by the uniselector reference) which when energised advances the stud switches in the corresponding uniselector by one position. The references SWYe, SWZf, SWMe and SWNe indicate interrupter contacts which are opened on energising the corresponding uniselector magnets.

Where terminals in different figures bear the same references, it implies that these contacts are connected together in the assembled machine. Contacts which serve to deliver signals from the reader 27 shown in Figure 2 are denoted by references A, thus A5, A6 and so on. Contacts which serve to deliver signals from the programme unit 32, the data stores 28 to 31b and the selector 33 are denoted respectively by references B, C and D. Any other contacts will be referred to specifically in the description.

In Figure 2, references X1 denotes a three phase motor which drives the record advancing mechanism, which may be of conventional construction. The drive is however transmitted to the mechanism only on engagement of a clutch and such engagement is secured by energisation of the armature winding denoted by X2. When the armature winding is energised the record is advanced intermittently, one row at a time and each row is sensed by the peckers SWF5 to SWF24.

Before proceeding further with the general description of Figures 2 to 5, the construction of the data stores 38 to 31b will be referred to. These stores are identical and each store comprises five sub-units (which are almost identical) one for each decimal digit of the code used on the record, and in the store shown in Figure 4, which will be assumed to be the store 28, corresponding parts in the different sub-units have the same reference numerals. In the case of Figure 4, relays are denoted by references RA to RD, the switches of these relays being differentiated, for example, as RA1, RA2, RA3 and so on. References MC1 to MC12 denote metal rectifiers. Only the sub-unit 1 and parts of the sub-units 2 and 5 of the data store 28 are shown in Figure 4, since the construction of the complete store can be gathered from these parts. The sub-unit 1 corresponds to the highest order decimal digit, sub-unit 2 corresponds to the decimal digit of next highest order and so on. When the store is clear, all the relays RA to RD are de-energised, but on the application of code signals to the terminals A5 to A24, when the peckers SWF5 to SWF24 sense a row of holes in the record, the relays are changed to a corresponding combination of states, provided a sensitising pulse is simultaneously applied to the terminal B1. The sensitising pulse is applied to all the relay circuits in one store, and it acts to "clear" any relay which does not simultaneously receive a code signal corresponding to a binary digit of value "one." Therefore it will be appreciated that a sensitising pulse can be regarded as clearing the data store, which will be changed to the "all zero" state unless code signals are simultaneously applied. The construction and operation of the relay circuits are described in detail in U.S. patent application Serial No. 459,794.

The sub-units of the store include analogue units denoted by the reference AU1 to AU5 having output terminals differentiated by suffixes $a$ and $b$ and when the relays in any sub-unit have been set in the combination of binary states which represents the corresponding decimal digit, the operation of switches in the analogue unit cause an alternating voltage to be set up between the output terminals having an amplitude analogous to the desired decimal digit. The voltages set up by the various analogue units have the same amplitude scale, and the voltages are combined in series by transformers TR2 to TR5, each of which produces an amplitude reduction by a factor 10, in such a way that the resultant voltage which is set up at the terminal C1 is the analogue of the five digit decimal number represented by a particular group of code signals applied to the terminals A5 to A24. The analogue output terminals of the other data stores 29 to 31, are denoted by the references $C1_2m$, $C1_3$ and $C1_4$, they appear in Figure 5. Similarly the input terminals for sensitising pulses in those data stores are denoted by the references $B1_2$ to $B1_6$, in Figure 3. The relay switches RA2 to RD2 set up output signals when the five binary digits of any decimal digit are all "one." One such output appears at terminal C2, corresponding to connection 62 of Figure 1, and represents "stop." Another such output appears at terminal C3, corresponding to connection 61 in Figure 1 and represents "error." The relay switches RA3 to RD3 in all sub-units set up an output which appears at terminal C4 (corresponding to connection 60) when an "all zero" state exists. This represents "zero advance." The connections 60, 61 and 62 are common to all stores, as seen in Figure 1, so that "stop," "error" and "zero advance" signals are effective in any store.

When the machine is being prepared for operation, a record of the instructions to be followed can be inserted by opening the door of the reader and subsequently opening the film gate. The opening of the door opens SWD and deenergises relay RLG and breaks the circuit for the motor X1 and the clutch armature winding X2. The opening of the film gate closes the switch SWA and completes a circuit via terminal A25, which energises the relay RLX in the programme unit (Figure 3). This in turn closes all the switches RLX1 to RLX6 and causes the simultaneous application of a sensitising signal, via terminals $B1_1$ to $B1_6$, to all the data stores 28 to 31, thus clearing the stores. When the record has been inserted, the closing of the gate and door, removes the common sensitising signals from the stores and conditions the motor X1 and armature winding X2 for operation Since all the stores are in "all zero" state, the zero advance signal from a terminal C4 energises relay RLC, closes switch RLC1, energises the clutch armature winding X2 and causes a sensing operation to be performed on the record. If the peckers SWF5 to SWF24 encounter no holes, as may be the case at the beginning of each record, the "zero advance signal" is maintained, and the process continued until an instruction is encountered on the record. Between successive sensing operations by the reader, the record drive mechanism closes the switch SWC, which feeds a "sensitising selector advance signal" by way of connection A27 (Figure 2) to electro-magnet SWZ and advances the respective uniselector one step. Consequently successive sensitising signals from terminal A26 are fed in cyclic order to the stores 28 to 31b. It is intended that the first actual instruction on the record will be "stop," namely five "ones" for the first decimal digit. The sensing action of the peckers is accompanied by closure of the switch SWB and this feeds a sensitising signal via A26, (which corresponds to the connection 64) to the brushes of the stud switch SWZe of the programme unit. Thus, the signal is applied to the sensitising signal input terminal of one of the data stores, say the terminal $B1_1$ of store 28. This sets up the "stop" signal in store 28, and the signal from terminal C2 energises relay RLD in the reader, breaking the clutch armature circuit at RLD1. As shown in Figure 1, the stop signal also passes to the programme unit 32 the selector 33 and the servo-amplifier 14. In the programme unit 32, the "stop" signal energises the relays RLU and RLW. The first relay closes the switches RLU1 and RL2 which complete self-advancing circuits for the uniselectors SWZ and SWY through their own interrupter contacts SWZf and SWYc. As a consquence, these uniselectors "home" until brushes of stud switches SWZa and SWYa engage open-circuited studs. When "home," stud-switch SWZe connects the sensitising pulse terminal A26 of the reader to terminal $B1_1$ of data store, in the selector 33, the stop signal energises the relay RLN. This completes a self-advancing circuit for the uniselectors SWM via the switch RLN1 the interrupter contacts SWMe, which has the effect of homing the uniselector SWM, until a brush of stud switch SWMa engage an open-circuited stud. A similar action initiated by RLN2 homes the uniselector SWN. The resistors R4 and R6 of the selector (Figure 5) are provided to reduce current dissipation in the electro-magnets SWM and SWN and are inserted in circuit by the relays RLK and RLL when the magnets are energised for any appreciable time. It is to be noted that although there are three home studs in each of the uniselectors SWY, SWM and SWN they are electrically indentical, since an operating cycle of each uniselector is completed in four steps. When the machine has "homed" in response to a "stop" signal, the relay RLC is energised.

The relays RLU, RLV and RLW perform functions which are not material to the present invention.

To start operation of the machine after a "stop" signal, the start switch (Figure 2) is closed. This energises the relay RLA and by the closure of the switch RLA2 energises the relay RLB which then holds itself by operating switch RLB1, at the same time de-energising RLA. During the time that RLA is energised, the clutch armature is energised by way of the switch RLA1 and one sensing operation ensures the switch RLG being closed. The action of RLB in de-energising relay RLA is to ensure that operation of the start switch will only over-ride one instruction on the record, even though the start switch is closed for longer than the time of one sensing operation. When the relay RLB is energised it closes the switch RLB2 and since RLD2 is closed due to the "stop" signal a clearing signal is set up at terminal A25, which clears all the stores by the action above described. This of course clears the stop signal.

The clearance of the "stop" signal allows the clutch to be energised through the switch RLC1, since the relay RLC is energised. This is the normal operating circuit for the clutch. The instruction now sensed by the operation of the clutch, is passed to one of the data-stores by the action of the sensitising pulse. This instruction will be assumed to be a dimensional instruction. Three further instructions are now sensed in succession and the corresponding code signals directed to the stores in cyclic order, the uniselector SWZ being advanced one step following the storage of each instruction. However when the fourth instruction has been passed to store, the uniselector SWZ now finds itself in position "four" while the uniselector SWY is yet in position "one" since apart from homing operation the uniselector SWY is advanced only on receipt of working advance signals at the terminal E1. Such signals are received, at times which will appear, from switch 57 via the connection 58 (Figure 1). When the uniselector SWZ is three positions or more in advance of the uniselector SWY, the circuit to ground from the reader advance terminal B2 via RLY1 is broken at one or other of the three stud switches SWZb, SWZc and SWZd. The breaking of this circuit simultaneously breaks a locking circuit, via terminal B3, which prevents rotation of the worktable (by biassing off the servo-amplifier 14 of Figure 1). Therefore the worktable begins to rotate and with it the interpolators' shaft 11 (Figure 1).

It is arranged that the rotation of the shaft 11 starts with the brush 56 on the mid-stud of the studs 36 to 45, belonging to the interpolator 34. The uniselectors SWM of the selector 33 (Figure 5) is in "home" position, thus feeding the analogue stored in, say, the stores 28, 29 and 30 to the interpolator 34 and at some time before the brush 56 reaches the stud 45 it is arranged that the switch 57 feeds a selector advance to the terminal E3 of the selector 33, advancing the uniselector SWN by one step. This causes SWN to apply the analogues set up in the stores 29, 30 and 31 to the interpolator 35 so that when brush 56 changes to stud 46 there is no discontinuity in the instruction signal to the error detector 21. Moreover when the changeover has taken place from interpolator 34, the switch 59 feeds a working advance signal to the terminal E1 of the programme unit (Figure 3). This working advance signal energises the relay RLY and subsequently the relay RLZ, which is a holding relay. The relay RLZ also inserts a resistor in series with the electro-magnet SWY to reduce the current dissipation therein. The working advance signal energises magnet SWY and advances the stud switches SWYa and SWYb. The energisation of relay RLY closes the switch RLY1 and completes a circuit to ground from the reader advance terminal B2 allowing energisation of the relay RLC of Figure 2, and the sensing of the next instruction, although no circuit is completed through any of the stud switches SWZb, SWZe, SWZc and SWYb. Therefore, the lock is not reimposed on the table rotation through the terminal B3. When the action of the working advance signal ceases, uniselector SWZ is in position 5, the last instruction having being passed to store 31a whilst the uniselector SWY is in position 2. This situation continues as long as the interpolator 35 is operating on the analogues derived from the data stores 29, 30 and 31. During this period the uniselector SWM receives a selector advance signal at E2 from the switch 57, and advances to apply the output of stores 30, 31 and 31b to the input of the interpolator 34 in readiness for the next changeover. After this changeover, another working advance signal is received from switch 57 at terminal E1 which initiates another reading cycle, and advances uniselector SWY to position 3. This process of operation continues indefinitely until another instruction "stop" is encountered, which stops operation and homes all the control mechanism, or until an "information only" signal is encountered, as will appear. The action of the "stop" signal is immediate, and therefore when coding instructions, account has to be taken of the fact that the end two instructions before "stop" are not acted upon, and must be dummies.

The above described control mechanism with its interlocks insures that the frequency with which instructions are read from the record is varied automatically to suit the rate of table rotation, and thus the rate of relative displacement between the axes of the cutter 1 and the table 2. Thus, a change in the rate of the table rotation produces a corresponding change in the rate of interpolation and the interpolator, by controlling the switch 57, automatically controls the rate of advance of the selector 33 and via the programme unit controls the frequency of reading, so that no instruction is read unless there is a store available to receive it.

As so far described the apparatus is the same as that illustrated in co-pending U.S. application Serial No. 518,912 except for the two extra stores 31a and 31b and for the corresponding modification of the connections to the stud switch SWZe and the stud switches SWMb, SWMc, SWMd, SWNb, SWNc and SWNd.

However in accordance with the invention, the gear box 12 is constructed as a variable ratio gear box, one gear ratio being provided for each ordinate spacing allowed for. For simplicity, it will be assumed that only two ordinate spacings are allowed for in the machine illustrated and therefore the gear box is only required to have two gear ratios, but provision may be made for a greater number of ordinate spacings. The gear ratio is changeable automatically by control mechanism 67, which will be referred to subsequently, in response to working advance signals transmitted by a gate 68. This gate 68 is normally closed but it can be opened in response to predetermined instructions and when open it transmits working advance signals from the working advance switch 57.

Figure 6:
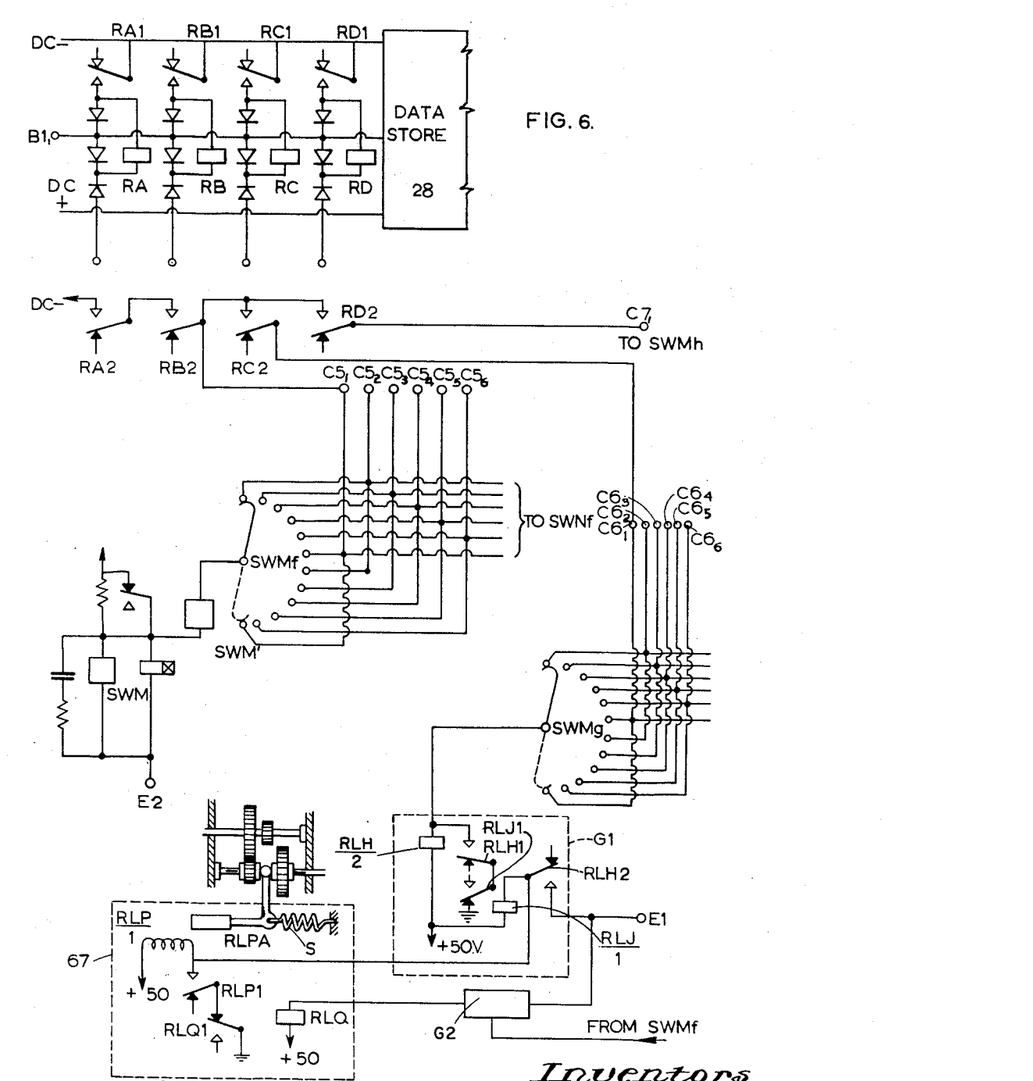
Figure 6 is a detail view of part of Figure 1.

Each of the six data stores also includes an additional sub-unit, as shown in Figure 6 of the accompanying drawings. This comprises four relays RA to RD connected in operating circuits similar to the relay circuits in the other sub-units of the store. Code signals are applied to the relay circuits RA to RD from terminals A1 to A4 at which appear signals corresponding to the first four bits of the twenty four bit binary code used on the record. These signals are derived when a sensing operation is performed on the record by the reader 27 as described in the co-pending application, for the case of the reader terminals A5 to A24. The relays in the additional sub-unit shown do not operate an analogue unit but are used merely for setting up signals to condition the machine either for discontinuous operation or for change in ordinate spacing or both. Such signals are referred to generally as "information only" signals. Thus, the relays RA to RD have a group of switches RA2 to RD2 and when the switches RA2 and RB2 are closed, which occurs when "one" is sensed in the first two positions of the binary code, a circuit is completed from the negative D.C. terminal to an output terminal $C5_1$ on the data store, yielding a selector advance signal. The other five data stores have similar output terminals $C5_2$ to $C5_6$ which are shown in Figure 6 although the data stores are not illustrated. The group of output terminal $C5_1$ to $C5_6$ are connected in a cyclic order to the studs of a stud switch SWMf which is an additional stud switch included in the uniselector SWM of the selector 33, the terminals $C5_1$ being connected to studs 6 and 12, $C5_2$ being connected to studs 1 and 7, $C5_3$ being connected to studs 2 and 8 and so on. This order of connection is the same as for the stud switch SWMe, which determines which data store has its output applied to the middle input terminal of the interpolator 34. The brushes of the stud switch SWMf are connected to one terminal of an additional electro-magnet SWM' for advancing the uniselector, the other terminal of this electro-magnet being as shown connected to a point of +50 volts potential. Thus if the relays RA and RB are energised in any store, the uniselector SWM is advanced one step, provided that store is connected to the middle input terminal of the interpolator 34. The same is true for the uniselector SFN and interpolator 35 since the terminals $C5_1$ to $C5_6$ are also connected to an additional stud switch SWNf included in the uniselector SWN in exactly the same way as the stud switch SWMf is included in the uniselector SWM. The additional stud switch SWNf is not however shown in the drawing since the connections to it will be apparent.

If the relays RA, RB and RC are energised, corresponding to "one" in each of the positions 1 to 3 of the code used, a circuit is completed from the negative D.C. line to another output terminal $C6_1$. This corresponds to a gear change signal. Corresponding output terminals in the other data stores are denoted by the terminals $C6_2$ to $C6_6$. The group of output terminals $C6_1$ to $C6_6$ are connected as shown to the studs of a stud switch SWMg which is also included in the uniselector SWM, and the brushes of the stud switch SWMg are connected to a relay RLH in the gate 68. The gate 68 has two sub-units which are identical and denoted respectively by the outlines G1 and G2. Since these sub-units are identical only the circuit of the sub-unit G1 is shown. The relay RLH operates a hold switch RLH1 and a gate switch RLH2 which when closed completes a circuit from the working advance terminal E1 of switch 57 via a relay winding RLP (in the control unit) to the +50 volt line and completes another circuit from the terminal E1 via a relay RLJ (in the gate) to the +50 volt line. When the RLH is energised by a gear change signal from any of the terminals C6, the gate switch RLH2 closes and allows the next working advance signal to energise relay RLP. When this relay is energised an armature RLPa is pulled to the left, as seen in Figure 6, and results in a reduction of the gear ratio of the gear box so that the rate of table rotation is reduced. Only a simple gear changing mechanism is shown, for illustration purposes, in Figure 6; in practice a practically instantaneous gear change without lost motion is required and to facilitate this the gear teeth may have their edges chamfered. Alternatively epicyclic gearing may be used. When relay RLP is energised it closes a holding circuit via the switch RLP1, assuming that the switch RLQ1 is closed. The working advance signal which energises RLP also energises the relay RLJ, breaking the holding circuit for RLH and opening the gate switch RLH2.

The gate switch RLH2 in the sub-unit G2 of the gate is controlled in exactly the same way as that in sub-unit G1 but the control signal is derived from a stud switch SWMh, which is not shown but is identical to the stud switch SWMg, except that it derives input signals from terminals C7. Only one of these terminals, namely C7, is shown and a signal appears at this terminal when the data store 28 receives an instruction having the combination 1101 for the first four digits. This is also a gear change signal, but in this case the working advance signal which is gated by the sub-unit G2 of gate 68 is not applied to the relay RLP in the control unit 67, but is applied to relay RLQ, the energisation of which breaks the hold circuit for the relay RLP. The relay RLP is consequently de-energised, allowing a return of the gear box 12 to the original gear ratio, under the action of return spring S.

It will be appreciated that both the gear change signals include the selector advance signal.

It is necessary to provide counterparts for the stud switches SWMg and SWMh in the uniselector SWN and to provide two further gate units since the working advance signals must be effective on the control mechanism 67 when an "information only" signal is encountered in any store connected in the "middle" position by either of the uniselectors SWM or SWN. It is necessary moreover to arrange that the gear ratio changes produced by working advance signals virtually coincide with the changes from one interpolator to the other, and suitable interlock means may be produced if need be to ensure this.

It will be appreciated from the foregoing that each gear change signal includes as a part the selector advance signal needed for discontinuous operation. In fact, an instantaneous gear change in itself constitutes a discontinuity and as will appear requires two selector advances additional to the normal selector advance. Thus in general when a gear change is required, two successive instructions include gear change signals in the first four places and though each produces an additional selector advance as required, only one of them is required to condition the gate 68, and the other is without effect thereon.

Figure 7:
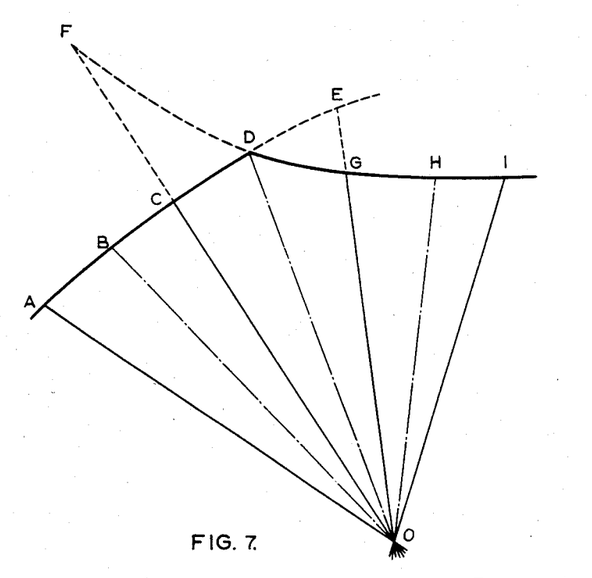
Figure 7 is a diagram illustrating the operation of the control system shown in Figure 1 where it is desired to cut a discontinuous profile.

Assume that the milling machine is required to cut a profile which has a discontinuous part A, D, I shown in Figure 7. The profile can be regarded as comprising parts of two continuous curves A, B, C, D, E and F, D, G, H, I, intersecting at D. The profile A, D, I, may be defined by angular ordinates OA, OB, OC, OD, OG, OH, OI, having a common point of origin O, and the alternate ordinate dimensions OA, OC, OG and OI are recorded as instructions in appropriate code form in the record. However the ordinate dimensions OF and OE are interposed in the record between the dimensions OC and OG, and the code 1100 denoting "information only" is included in the perforated record in association with the dimensions OF and OE. Thus in effect the curve A, B, C, E, is defined in the record by the dimensions of the ordinates OA, OC and OE, and similarly the curve D, G, H, I, is defined by the dimensions of the ordinate OF, OG and OI.

To illustrate the operation of the machine, assume that the dimensions OA, OC and OE are set up in the third, fourth and fifth of the stores 30, 31 and 31a and are taken into service in the interpolator 35. Dimension OF is set up in the sixth store 31b and during the period when OA, OC and OE are in service the second selector 33 conditions the interpolator 34 by the normal process to accept the dimensions in the fourth, fifth and sixth stores 31, 31a and 31b, that is OC and OE and OF. However, when the dimension OE is set up in the fifth store 31a the uniselector is caused to advance an extra step since an information only signal appears in a "middle" position and as a consequence the output of stores 31a, 31b and 28 are applied to the interpolator 34. It is arranged moreover that when either the uniselector SWM or SWN undergoes an advance in response to an information only signal, an additional reading cycle is initiated in the reader 27. This can be achieved by a suitable coupling between reader and the circuits of the electromagnet SWM' and the corresponding electro-magnet in the uniselector SWN. Consequently the dimension OG is read from the record and stored as an analogue in the store 28 and the uniselector SWM now feeds OE, OF, and OG in the store 28, to the input terminals of the interpolator 34. But the stud switch SWM*f* observes another information only signal in a "middle" position, namely that associated with the dimension OF, and initiates another one step advance of the uniselector and the reading of the next instruction from the record, namely OI which is set up in the store 29. The uniselector SWM now applies the instructions OF, OG and OI to the interpolator 34 and as the middle position is not now occupied by an "information only" dimension, the uniselector rests and in due time the interpolator 34 takes over from the interpolator 35. The change over occurs at point D, from which point the interpolator 34 traces the curve DGH, so that discontinuous operation has been achieved. It will be appreciated that the reading of the instructions from the perforated record must run in advance of the selection of the instructions from the storage units by a sufficient amount to allow for the ordinate selectors being self-impulsed forward by up to two positions. Consequently, six dimensional relay storage units are necessary.

Figure 8:
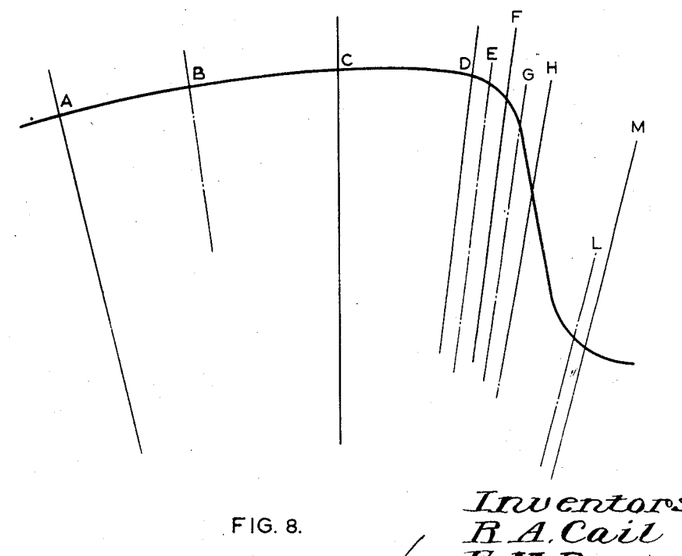
Figure 8 is a diagram illustrating the operation of the control system shown in Figure 1 where a change occurs in the ordinate spacing of the recorded instructions.

To illustrate how a change of ordinate spacing is effected, it will now be assumed that the machine is required to cut a profile such as shown in Figure 8 which, over the region AE exhibits only a small change of profile, whilst over the region EM there is a large change of profile. For example, in order to cut the profile in the region AE, an ordinate spacing of, say 16° is adequate and dimensions of the ordinates OA, OC and OM (the origin O is not shown in Figure 6) are recorded on the record, the dimension OM being associated with "information only" signal 1110 which not only comprises the selector advance signal but the signal demanding a change of gear ratio so that the interpolator brush 56 is rotated more quickly. These dimensions are used to control the cutting of the profile up to point E. To control cutting of the profile in the region EL (say) a 2° inter-ordinate spacing is selected and dimensions of the ordinates OD, OG, OH . . . are recorded on the record. The instruction OD is however also associated with the "information only" signal 1110. Therefore when the machine encounters the instructions OL and OD the uniselector SWM or the uniselector SWN, whichever is effective at the time, is advanced by two additional steps as described in the case of the discontinuous profile of Figure 7. The advance is in addition accompanied by the closing of the gate switch RLH2 in the gate 68 so that at the next change over from one interpolator to the other, the change over is accompanied by a virtually instantaneous change in the gear ratio in the gear box 12 to suit the new ordinate spacing. It will be appreciated that by virtue of the synchronisation of the rotation of the table 2 and of the brush 56 a change in the ratio of the gear box 12 changes the rate of relative rotation between the table and the interpolator brush 56 to suit the new inter-ordinate spacing thereby producing a corresponding change in the rate of interpolation effected by the interpolators 34 and 35. Moreover by virtue of the interconnection between the working advance switch 57, the selector 33 the programme unit 32 and the reader 27, the adjustment of the rate of interpolation produces a corresponding adjustment in the frequency of operation of the other parts of the control mechanism. A change in the ordinate spacing is therefore treated by the machine as a discontinuity in the profile being cut, the gear ratio of the gear box 12 being changed at the point which is treated as a discontinuity.

If at a subsequent point in the profile it is desired to return to the original ordinate spacing, this can be achieved by again introducing two instructions associated with the "information only" signal 1110. This again causes the machine to treat the change over point as a point of discontinuity, but in this case the working advance signal appearing at the terminal E1 is transmitted not by the gate unit G1 but by the gate unit G2 and energises the relay RLQ which de-energises the relay RLP and allows the gear ratio to return to its original value by the action of the spring S.

It will of course be appreciated that other code combinations than those described can be used to denote "information only" signals, and if provision is made for more than two different ordinate spacings in the machine, a greater number of "information only" signals will be required. It will also be understood that the constructional details of the machine may be changed in a variety of ways, for instance the invention is not confined to control systems for machines which employ cylindrical co-ordinates and is not confined to milling machines but may be applied to other machines for shaping workpieces. Moreover in so far as the invention is applicable to producing a change of the ordinate spacing it is not confined to control systems in which the instructions are subjected to quadratic or higher order interpolation, but may be applied to control systems in which the instruction are subjected to only linear interpolation.

It will be appreciated that the machine described operates in response to discrete instruction signals derived from a record and corresponding to relatively widely spaced ordinates of a desired locus. Interpolation is carried out among groups of the signals derived from the record to produce a virtually continuously variable command signal. The interpolator is of higher than linear order and the order may be represented as $n-1$, where $n$ is 3. To achieve such interpolation it is necessary to apply a group of $n$ instruction signals to the interpolator at any one time, and to ensure that there is an adequate number of instructions available for the interpolator, $m$ stores are employed, where $m=2n$. The stepping switches SWM and SWN constitute a selector having $m$ inputs and two groups of $n$ outputs. The selector thus constituted is synchronized with the operation of the interpolator to connect groups of the inputs in a prearranged cycle to said two groups of outputs. Thus in one cycle of operation of the selector, the first to the $n$th of the inputs are connected respectively to one of the groups of outputs, the second to the $(n+1)$th of the inputs is then connected to the other group of outputs, the third to the $(n+2)$th of the inputs is then connected to the first group of outputs, and so on. Furthermore in accordance with the invention means are provided for modifying operation of the selector in such a way as to cause it to skip predetermined steps in the cycle so that discontinuous operation can be achieved. In the example described the selector is caused to skip $n-1$ steps of its cycle.

What we claim is:

1. A control system suitable for machine tools comprising means for reading a record to derive discrete instruction signals corresponding to relatively widely spaced ordinates of a desired locus, at least six stores, means for applying discrete instruction signals derived from said reading means in cyclic order to said stores, an interpolator of higher than linear order, selector means having inputs one for each store connected to the respective store and having two groups of outputs for applying signals to said interpolator, each group including at least three outputs, said interpolator being responsive alternately to signals applied by said groups of selector outputs to derive a signal which varies to represent more closely spaced ordinates of said locus, synchronising means for operating said selector in timed relationship with said interpolator to connect groups of said inputs in a prearranged cycle to said two groups of outputs, and operation modifying means for causing said selector to skip predetermined steps in a cycle to allow said interpolator to negotiate discontinuities in said locus.

2. A control system suitable for machine tools comprising means for reading a record to derive discrete instruction signals corresponding to relatively widely spaced ordinates of a desired locus, a plurality of stores, $m$ in number where $m$ is an even integer at least six, means for applying discrete instruction signals from said reading means in cyclic order to said stores, an interpolator of order $n-1$ where $n$ is half $m$, a selector having $m$ inputs one for each store connected to the respective store and having two groups of $n$ outputs for applying signals to said interpolator, synchronising means for normally operating said selector in timed relationship with said interpolator to connect the first to the $n$th of said inputs respectively to one group of outputs, then to connect the second to the $(n+1)$th of said inputs to the other group of outputs, then to connect the third to the $(n+2)$th input to the first mentioned group of outputs, and so on in cyclic order, said interpolator being responsive alternately to signals applied by said groups of selector outputs to derive a signal which varies to represent more closely spaced ordinates of said locus, and operation modifying means for causing said selector to skip $n-1$ steps of thel cycle of operation, to allow said interpolator to negotiate discontinuities in said locus.

3. A control system according to claim 1, said selector comprising stepping switch means responsive to impulses derived from said synchronising means to perform successive steps in its cycle of operation, and said operation modifying means including means for selectively applying additional impulses to said stepping switch means.

4. A system according to claim 3, said operation modifying means including means responsive to a predetermined signal from said reading means to apply an additional impulse to said stepping switch means.

5. A control system according to claim 1, said operation modifying means including means to modify the interpolation rate of said interpolator to correspond to a change or ordinate spacing for said instruction signals.

6. A control system according to claim 2, comprising means for producing displacement in one co-ordinate direction in response to said signal derived from said interpolator, means for producing change of displacement in another co-ordinate direction at a rate related to the rate of operation of said interpolator, and said operation modifying means including means for selectively varying the rate of operation of said interpolator relative to the rate of change of displacement in said other co-ordinate direction, following a skip of said selector.

7. A control system suitable for machine tools comprising means for reading a record to derive discrete instruction signals corresponding to relatively widely spaced ordinates of a desired locus, an interpolator having a number of output terminals large compared with two, selector means for applying said discrete signals in group of at least two to said interpolator, said interpolator being responsive to applied signals to produce at said output terminals a series of signals which represent more closely spaced ordinates of said locus, other selector means movable to select output signals in succession from said output terminals, first and second parts the relative positions of which are to be controlled, means for displacing one of said parts relative to the other in one co-ordinate in response to the signal selected by said other selector means, means for displacing said one part relative to the other in another co-ordinate and for concomitantly displacing said selector from one output terminal to another in succession to represent displacement from one of said closely spaced ordinates to another, and means responsive to a predetermined signal for modifying the rate of displacement of said one part relative to the other in said other co-ordinate relative to the rate of displacement of said selector from one output terminal to the other to correspond to a change of the ordinate spacing of said discrete instruction signals.

References Cited in the file of this patent

UNITED STATES PATENTS

| | | |
|---|---|---|
| 2,537,427 | Seid et al. | Jan. 9, 1951 |
| 2,628,539 | Neergaard | Feb. 17, 1953 |
| 2,685,054 | Brenner et al. | July 27, 1954 |
| 2,710,934 | Senn | June 14, 1955 |
| 2,736,852 | Nelson | Feb. 28, 1956 |
| 2,784,359 | Kamm | Mar. 5, 1957 |

OTHER REFERENCES

Report entitled "A Numerically Controlled Milling Machine," published by Servomechanisms Laboratory, Massachusetts Institute of Technology, May 31, 1953, 259 pages.